Aug. 9, 1966     K. H. CARPENTER     3,264,671
ELECTRO-HYDRAULIC ACCESSORY POWER SUPPLY
Filed Dec. 10, 1964
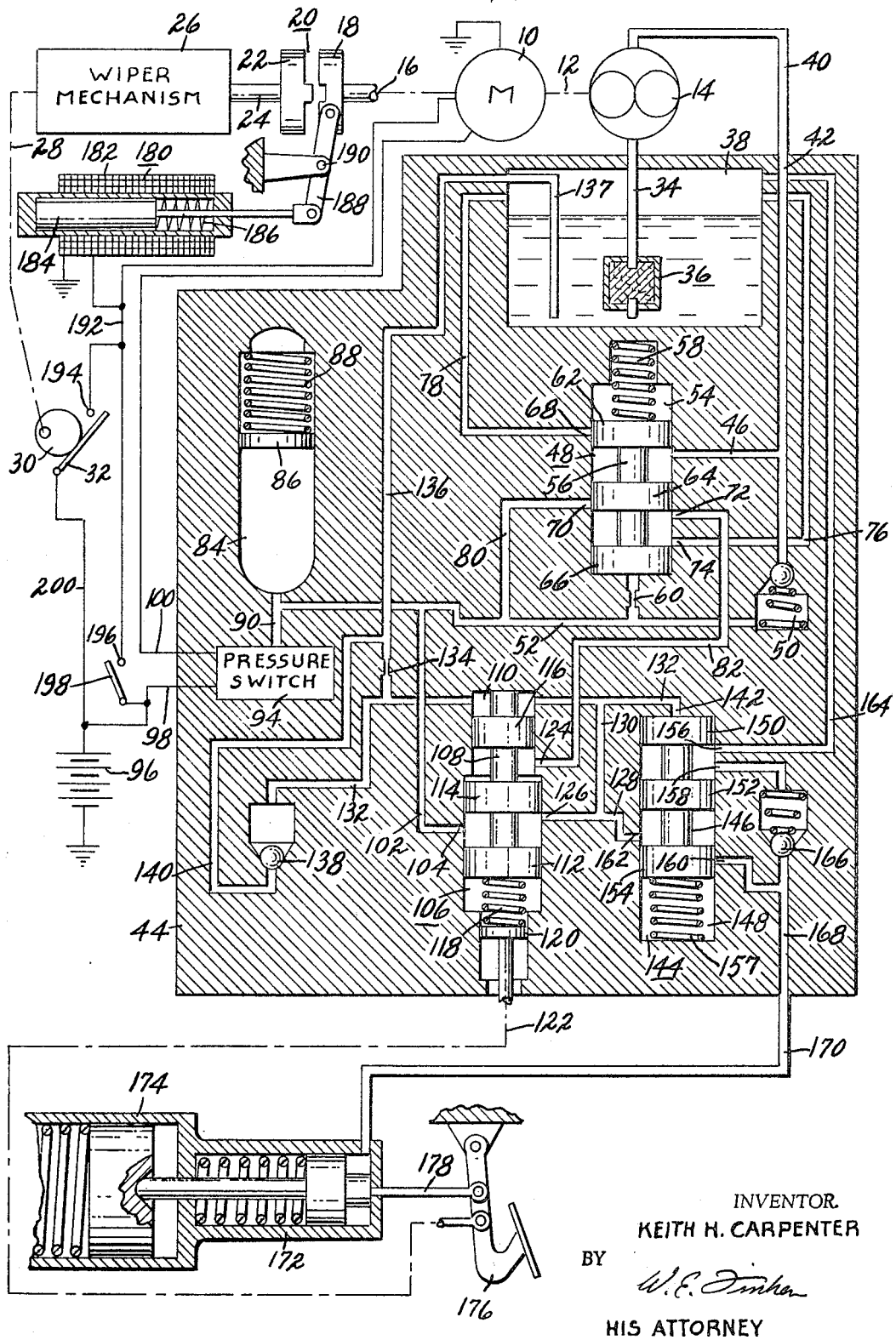
INVENTOR.
KEITH H. CARPENTER
BY
*W. E. Finher*
HIS ATTORNEY

United States Patent Office 3,264,671
Patented August 9, 1966

3,264,671
ELECTRO-HYDRAULIC ACCESSORY
POWER SUPPLY
Keith H. Carpenter, Pittsford, N.Y., assignor to General Motors Corporation, Detroit, Mich., a corporation of Delaware
Filed Dec. 10, 1964, Ser. No. 417,294
9 Claims. (Cl. 15—250.30)

This invention pertains to automotive accessory drives, and particularly to an electro-hydraulic power supply for operating automotive accessories.

At the present time there are numerous accessories on a vehicle which are either power assisted in operation or power operated, such as brakes, antennas and convertible tops. It has been the custom to provide an entirely separate power supply for each accessory even though the accessories are only intermittently operated and thus do not require a continuous duty power supply. In addition, the various power supplies for these accessories are space consuming, and substantial economies could be realized by utilizing a single, centralized power supply for a number of intermittent duty power operated vehicle accessories.

The present invention relates to a centralized accessory power supply of the electro-hydraulic type wherein the prime mover comprises an electric motor adapted for continuous duty operation, and which can conveniently thus be used to operate the vehicle windshield cleaning system. Accordingly, among my objects are the provision of an electro-hydraulic accessory power supply for motor vehicles; the further provision of an electro-hydraulic accessory power supply including a continuous duty electric windshield wiper motor for charging an accumulator and clutch means for interconnecting the wiper motor with the windshield cleaning system; the further provision of an electro-hydraulic power supply of the aforesaid type including means for continuously operating the wiper motor upon demand without overcharging the accumulator; and the still further provision of an electro-hydraulic power supply of the aforesaid type including a sequence valve for connecting the hydraulic power supply with an accessory.

The aforementioned and other objects are accomplished in the present invention by directly coupling the electric wiper motor to a hydraulic pump and connecting the wiper motor to the windshield cleaning mechanism through a solenoid operated clutch. The wiper motor drives the pump to maintain a predetermined charge in an accumulator under the control of a pressure relief valve for bypassing the hydraulic flow from the pump outlet to the pump inlet when the accumulator is fully charged and operation of the windshield cleaning system is selected by a manually operated switch.

Further objects and advantages of the present invention will be apparent from the following description, reference being had to the accompanying drawing, wherein a preferred embodiment of the present invention is clearly shown.

In the drawing:

The drawing depicts an electrical and hydraulic schematic of the improved electro-hydraulic accessory power supply, the parts being shown in the positions they occupy when the accumulator is not charged.

With reference to the drawing, the electro-hydraulic accessory power supply of the present invention includes a unidirectional direct current motor 10 having a direct mechanical coupling 12 to a gear pump 14 and a direct mechanical coupling 16 to the driving member 18 of a clutch 20. The clutch 20 includes a driven member 22 attached to a shaft 24 which is coupled to a windshield wiper mechanism 26 including a conventional gear reduction unit having a rotary output crank, not shown, which is connected by linkages to a pair of spaced pivot shafts, not shown, for converting rotation to oscillation. Moreover, in accordance with conventional practice, the rotary output crank is connected by a mechanical linkage 28 to a cam 30 for cyclically actuating a parking switch 32 when the wiper blades arrive at their parked positions adjacent the lower reveal molding of the windshield. The wiper mechanism, per se, constitutes no part of the present invention but may be of the type shown in Ziegler Patent 3,059,264.

The pump 14 has its inlet 34 connected through a filter 36 to a reservoir, or sump, 38 containing hydraulic fluid. The pump outlet is connected to a conduit 40, the conduit 40 being connected to a passage 42 in a unitary housing 44 for the hydraulic system. The passage 42 is connected by a passage 46 to a relief valve 48 and through a spring biased one-way check valve 50 to a passage 52. The relief valve 48 is mounted in a valve bore 54 and comprises a spool 56 biased by a spring 58. The lower end of the valve bore 54 communicates with passage 52 through a restricted orifice 60. The valve spool 56 includes spaced lands, 62, 64 and 66, the land 62 coacting with a port 68 and the land 64 coacting with ports 70 and 72. Land 66 coacts with port 74 connected by passage 76 to the sump 38. Port 68 is connected to sump 38 by a passage 78. Port 70 is connected to passage 52 through passage 80, and port 72 is connected to a passage 82.

Passage 52 connects with an accumulator chamber 84 having a piston 86 therein biased by a spring 88. The accumulator chamber 84 also connects through passage 90 with a conventional pressure switch 94. When the accumulator 84 is not fully charged with pressure, switch 94 will be closed so as to energize the motor 10 to activate the pump 14 through a circuit including a battery 96, wire 98, switch 94 and wire 100. When the pump 14 is operating hydraulic fluid is drawn from the sump 38 and delivered under pressure through conduit 40 to the passage 42, through the check valve 50 and the passage 52 to the accumulator 84. The relief valve 48 operates to connect passage 42 through passage 46 to port 68 of the passage 78 back to the sump 38 when the accumulator 84 is substantially fully charged due to pressure acting on the land 66 through restricted passage 60 causing upward movement of the spool valve 56. Of course, when the accumulator is fully charged, the pressure switch 94 will open so as to deenergize the motor 10 and inactivate the pump 14.

The passage 52 is connected by branch passage 102 to a port 104 of a pressure reducing valve 106. The pressure reducing valve 106 comprises a valve spool 108 mounted for reciprocation in a stepped diameter valve bore 110 in the housing 44. The valve spool includes spaced large diameter lands 112 and 114 and a smaller diameter land 116, and is normally biased upwardly by a spring 118 having a lower spring seat 120 which can be mechanically positioned through a linkage 122. A port 124 communicates with the smaller diameter portion of valve bore 110 and with the passage 82. A port 126 connects with the larger diameter portion of the valve bore 110 and with a passage 128 that is connected by a passage 130 with a passage 132. Passage 132 communicates at all times with the upper end of the valve bore 110. In addition, passage 132 is connected through a bleed orifice 134 to a passage 136 connected to the sump 38, and with a foot valve 138 connected by passages 140 and 136 to the sump 38. Passage 136 connects with a conduit 137 having its open end submerged in the sump 38. In addition, the passage 132 connects with a port 142 of a sequence valve 144 comprising a valve spool 146 mounted for reciprocation in a valve bore 148 in the housing 44. The valve spool 146 includes spaced lands 150, 152 and 154 and is biased upwardly by a spring 157. In addition, the sequence valve 144 includes side wall ports 156, 158, 160 and 162. Side wall port 156 coacts with land 150 and is connected to a passage 164 that communicates with the sump 38. Port 158 is connected to a spring biased one-way check valve 166. Port 160 is connected to a passage 168 that connects with a conduit 170 as well as with the check valve 166, and port 162 is connected to the passage 128.

In the exemplary embodiment disclosed herein, the conduit 170 connects with a power assist cylinder 172 associated with a master cylinder 174 of a hydraulically actuated vehicle braking system. The mechanical linkage 122 is connected to a pivotally mounted brake pedal 176 which is likewise connected to the piston assemblies in the master brake cylinder by a rod 178. Other hydraulically operated accessories would be connected through suitable three-way valves to the passage 102.

The windshield wiper control mechanism includes a solenoid 180 having a winding 182 and a plunger 184 biased by a spring 186. The plunger 184 is connected through a lever 188 having an intermediate pivot 190 to the axially slidable driving clutch member 18. One terminal of the solenoid winding 182 is connected to ground, and the other terminal is connected through a wire 192 that connects with the motor 10 as well as with a stationary switch contact 194 of the parking switch and a stationary switch contact 196 of a manual switch having movable contact 198. The movable contact of the parking switch 32 is connected by a wire 200 to the battery 96. Accordingly, it can be seen that the parking switch is connected in parallel with the manual control switch such that when the manual control switch is closed the motor 10 will be energized irrespective of the pressure switch 94 being open, and the solenoid 180 will be energized to engage the clutch 20. As long as the manual switch is closed, the motor 10 will be activated continuously to actuate the wiper mechanism 26 as well as to drive the pump 14. When the manual wiper switch is opened, the wiper mechanism 26 will be automatically deenergized by the parking switch when the contact 32 is disengaged from contact 194 by the cam 30 when the wiper mechanism arrives at its parked position. When the parking switch is open and the manual control switch open, the solenoid 180 will be deenergized to disengage the clutch 20 and the motor 10 will be returned to control of the pressure switch 94.

Assuming the accumulator 84 to be full of hydraulic fluid under substantially no pressure, energization of the motor 10 by the pressure switch 94 to activate the pump 14 will result in charging the accumulator 84 through the conduit 40, the passage 42, the check valve 50 and the passage 52. After the pressure builds up in the accumulator 84, it will be communicated through restricted orifice 60 to the relief valve 48 and cause upward movement of the valve spool 56 so as to interconnect ports 70 and 72 after land 66 blocks port 74, and at the same time land 62 will continue to block port 68. Under these conditions hydraulic fluid under pressure from the passage 52 will flow through the passages 80, ports 70 and 72 through passage 82 and through port 124 to the valve bore 110 and act on the differential area of lands 114 and 116 so as to cause downward movement of the valve spool 108 so that land 114 will block port 126 and thereby prevent bleeding the accumulator to the sump, or reservoir, 38. During downward movement of the valve spool 108, the upper end of the valve port 110 above land 116 will be filled with hydraulic fluid from the sump 38 through passages 136 and 140, and the foot valve 138 and passage 132. When the accumulator is fully charged the pressure switch 94 will open due to deenergization of the motor 10. If, however, the manual wiper control switch is closed at this time, the motor 10 will continue to be energized thereby operating the pump 14 which will cause the pressure relief valve 48 to operate. Thus, when the accumulator 84 is fully charged and the pump 14 is operating, the valve spool 56 will move upwardly due to pressure acting on the bottom of land 66 until port 68 is connected with the passage 46 whereby the pump output will be bypassed back to the reservoir 38 through passages 42 and 46, the valve bore 54, port 68 and passage 78.

The accumulator charge is maintained by check valve 50 and the normally closed pressure reducing valve 106. However, when the brake pedal 176 is depressed to actuate the vehicle brakes, the spring seat 120 will be moved upwardly through the mechanical linkage 122 so as to reset the spring load and move the reducing valve spool 108 to a position whereat the ports 104 and 126 are connected through the valve bore 110, thus supplying hydraulic fluid under pressure to the passages 130 and 132. The reduced pressure in passage 132 will flow through port 142 so as to move the sequence valve plunger 146 downwardly to interconnect ports 162 and 160 thereby permitting hydraulic fluid under pressure to flow from the accumulator 84 through passages 52 and 102, the ports 104 and 126, the passage 128, and the ports 162 and 160 to the passage 168 and the conduit 170 to the power assist cylinder 72.

Upon release of the brake pedal 176 the hydraulic fluid in the power assist cylinder 172 will flow back to the reservoir 38 through conduit 170 and passage 168 and through the check valve 166. It will be appreciated that as soon as the brake pedal 176 is released, the reducing valve plunger 108 will return to the position where land 114 blocks port 126 thus permitting the sequence valve spool 146 to return to the position shown in the drawing, and accordingly, ports 158 and 156 will be interconnected through the valve bore 148 allowing the hydraulic fluid from the power assist cylinder 172 to exhaust to the reservoir 38 through the passage 164. The hydraulic fluid above the land 150 of the sequence valve flows back to the sump through port 142, passage 132, orifice 134 and passage 136.

From the foregoing it is manifest that the present invention provides an electro-hydraulic accessory power supply which can be used to operate one or a plurality of intermittently actuated accessories of a vehicle from a continuous duty electric motor which also may be used to operate the windshield cleaning mechanism of the vehicle. In this manner a single centralized hydraulic power supply can be used to replace several independent power supplies for the several accessories.

While the embodiment of the invention as herein disclosed constitutes a preferred form, it is to be understood that other forms might be adopted.

What is claimed is as follows:

1. An electro-hydraulic accessory power supply for a vehicle comprising, an electric motor, first and second energizing circuits for said motor, a pump directly coupled to said electric motor having an inlet connected to a sump and an outlet, an accumulator connected to the outlet of said pump, a relief valve connected with the output of said pump and with said accumulator for bypassing the output of said pump to the sump when said accumulator is fully charged, said first energizing circuit including a pressure switch responsive to pressure in said accumulator, windshield cleaning mechanism, electrically actuated means connected in said second energizing circuit for coupling said motor with said windshield cleaning mechanism, and manual switch means in said second energizing circuit.

2. An electro-hydraulic accessory power supply for a vehicle comprising, an electric motor, a pump directly coupled to said electric motor having an inlet connected to a sump and an outlet, an accumulator connected to the outlet of said pump, a first energizing circuit for said motor including a pressure switch responsive to pressure in said accumulator for deenergizing said motor when the accumulator is fully charged, a relief valve connected with the outlet of said pump and with said accumulator for bypassing the output of said pump to the sump when said accumulator is fully charged, a pressure reducer valve connected with said accumulator and having a manually controlled pressure setting, a spring biased, servo actuated sequence valve connected with said pressure reducer valve and having an outlet passage, means for adjusting the pressure setting of said pressure reducer valve to actuate the sequence valve and connect said accumulator with an accessory, windshield cleaning mechanism, electrically controlled clutch means for interconnecting said motor with said windshield cleaning mechanism, and a second energizing circuit for said motor including a manually operable switch for energizing said motor and said clutch means irrespective of said pressure switch.

3. An electro-hydraulic accessory power supply for a vehicle comprising, a continuous duty electric motor, first and second energizing circuits for said motor, a pump directly coupled to said electric motor having an inlet connected to a sump and an outlet, an accumulator connected to the outlet of said pump, a relief valve connected with the outlet of said pump and with said accumulator and having first, second and third positions, a pressure reducer valve connected with said accumulator having a first position wherein the outlet of said reducer valve is open and a second position wherein the outlet of said reducer valve is closed, said relief valve being movable from its first position to its second position in response to a build up of pressure in said accumulator so as to cause servo actuation of said reducer valve from its first position to its second position, said relief valve being movable to its third position when said accumulator is substantially fully charged so as to bypass the output of said pump to said sump while maintaining the reducer valve in its second position, said first energizing circuit including a pressure switch responsive to accumulator pressure for automatically deenergizing said motor when the accumulator is substantially fully charged, and a manual switch in the second energizing circuit for completing the energizing circuit to said motor irrespective of said pressure switch.

4. An electro-hydraulic accessory power supply for a vehicle comprising, a continuous duty electric motor, first and second energizing circuits for said motor, a pump directly coupled to said electric motor having an inlet connected to a sump and an outlet, an accumulator connected to the outlet of said pump, a relief valve connected with the outlet of said pump and with said accumulator and having first, second and third positions, a pressure reducer valve connected with said accumulator having a first position wherein the outlet of said reducer valve is open and a second position wherein the outlet of said reducer valve is closed, said relief valve being movable from its first position to its second position in response to a build up of pressure in said accumulator so as to cause servo actuation of said reducer valve from its first position to its second position, said relief valve being movable to its third position when said accumulator is substantially fully charged so as to bypass the output of said pump to said sump view maintaining the reducer valve in its second position, said first energizing circuit including a pressure switch responsive to accumulator pressure for automatically deenergizing said motor when the accumulator is substantially fully charged, a manual switch in the second energizing circuit for completing the energizing circuit to said motor irrespective of said pressure switch, a servo actuated sequence valve connected with the outlet of said pressure reducer valve, and means operable to adjust the pressure setting of said pressure reducer valve to move said reducer valve from its second position to its first position to actuate the sequence valve and connect said accumulator with an accessory.

5. An electro-hydraulic accessory power supply for a vehicle comprising, a continuous duty electric motor, first and second energizing circuits for said motor, a pump directly coupled to said electric motor having an inlet connected to a sump and an outlet, an accumulator connected to the outlet of said pump, a relief valve connected with the outlet of said pump and with said accumulator and having first, second and third positions, a pressure reducer valve connected with said accumulator having a first position wherein the outlet of said reducer valve is open and a second position wherein the outlet of said reducer valve is closed, said relief valve being movable from its first position to its second position in response to a build up of pressure in said accumulator so as to cause servo actuation of said reducer valve from its first position to its second position, said relief valve being movable to its third position when said accumulator is substantially fully charged so as to bypass the output of said pump to said sump while maintaining the reducer valve in its second position, said first energizing circuit including a pressure switch responsive to accumulator pressure for automatically deenergizing said motor when the accumulator is substantially fully charged, a manual switch in the second energizing circuit for completing the energizing circuit to said motor irrespective of said pressure switch, a servo actuated sequence valve connected with the outlet of said pressure reducer valve, means operable to adjust the pressure setting of said pressure reducer valve to move said reducer valve from its second position to its first position to actuate the sequence valve and connect said accumulator with an accessory, windshield cleaning mechanism, and an electrically operated clutch connected in said second energizing circuit for interconnecting said motor and said windshield cleaning mechanism upon closure of said manual switch.

6. The electro-hydraulic accessory power supply set forth in claim 4 wherein said pressure reducer valve comprises a stepped diameter valve spool mounted in a stepped diameter valve bore, and resilient means normally urging said spool to its first position.

7. The electro-hydraulic accessory power supply set forth in claim 6 including a manually adjustable spring seat for said resilient means to increase the load on said resilient means and move said valve spool from its second position to its first position in opposition to servo actuation thereof.

8. The electro-hydraulic accessory control system set forth in claim 4 wherein said sequence valve comprises a servo actuated, spring loaded spool valve.

9. The electro-hydraulic power supply set forth in claim 3 wherein the interconnection between said accumulator and said relief valve includes a restricted orifice, and wherein said relief valve comprises a servo actuated, spring loaded spool valve.

No references cited.

CHARLES A. WILLMUTH, *Primary Examiner.*